United States Patent
Olsen

(10) Patent No.: US 7,043,108 B1
(45) Date of Patent: May 9, 2006

(54) PLANAR MULTIPLE-TAPPED OPTICAL DELAY LINE

(75) Inventor: Randall B. Olsen, Carlsbad, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/972,104

(22) Filed: Oct. 22, 2004

(51) Int. Cl.
    *G02B 6/12* (2006.01)
(52) U.S. Cl. .............................. 385/14; 385/27; 385/43
(58) Field of Classification Search ............ 385/14–15, 385/24–32, 41–43, 129–142
    See application file for complete search history.

(56) References Cited

U.S. PATENT DOCUMENTS 5,109,446 A * 4/1992 Kaltschmidt .................. 385/24
6,731,828 B1 * 5/2004 Kitou et al. .................. 385/14
2004/0136681 A1 * 7/2004 Drewery et al. ............. 385/142
2005/0185879 A1 * 8/2005 Dawes ......................... 385/14

OTHER PUBLICATIONS

Y.P. Li and C.H. Henry, "Silica-based optical integrated circuits", IEE Proc.-Optoelectron, Oct. 1996, pp. 263-280, vol. 143, No. 5.

* cited by examiner

*Primary Examiner*—Phan Palmer
(74) *Attorney, Agent, or Firm*—Peter A. Lipovsky; Michael A. Kagan; Andrew J. Cameron

(57) ABSTRACT

Photonic signals of high bandwidth are input into a planar spiral of waveguide. The spiral has a number of waveguide loops having a series optical tap areas wherein optical energy is leaked from the loops. The leaked optical energy is received by optical tap waveguides that carry the light for further processing.

8 Claims, 6 Drawing Sheets

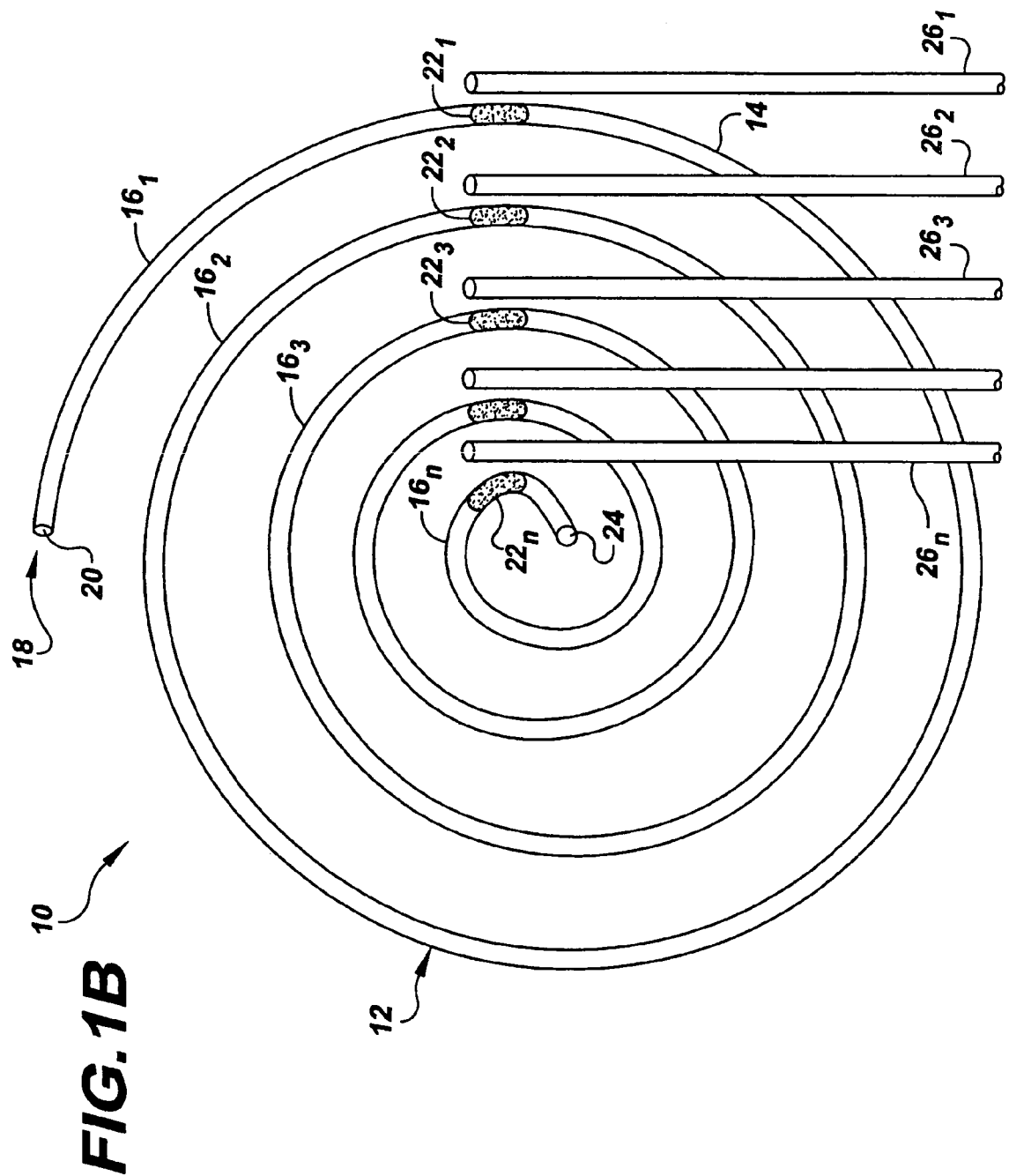

PLANAR MULTIPLE-TAPPED OPTICAL DELAY LINE

BACKGROUND

An optical delay line can be used to separate the particular colors of a chromatic spectrum. An example of such a device is an array waveguide grating (AWG). If a conventional AWG is designed for extremely high color resolution, the AWG must have great physical size. This size can easily exceed that of a common silicon wafer.

There is thus a need for an optical delay line that provides high color resolution but that is compact. For many applications it is desirable that such a delay line be realizable in planar form. An optical delay line having these attributes can enable a very high resolution AWG system (a hyper-resolution AWG system).

SUMMARY

Photonic signals of high bandwidth are input into a spiral of waveguide. The spiral has a number of waveguide loops that provide a series optical taps at the surface of the spiral. Optical energy is released at the taps into tap waveguides that carry the light for further processing.

Other objects, advantages and new features will become apparent from the following detailed description when considered in conjunction with the accompanying drawings.

BRIEF DESCRIPTION OF THE DRAWINGS

FIGS. 1A and 1B illustrate a partial view of a multiple-tapped optical delay line according to the description herein, shown without and with tap waveguides, respectively.

DESCRIPTION

Figure 1A:
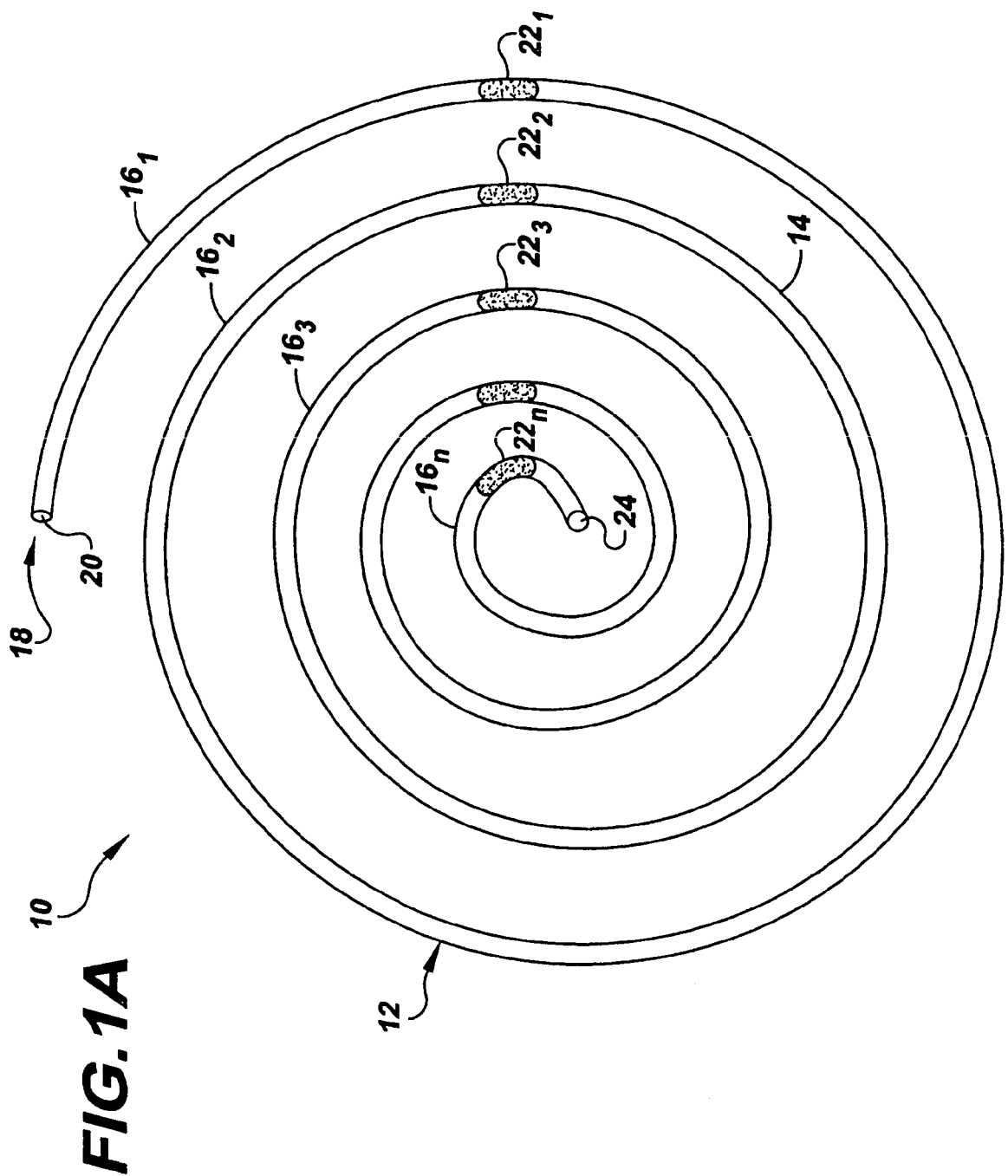

Referring now to FIG. 1A, a representative delay line 10 is shown. Delay line 10 includes a spiral 12 of optical waveguide 14. Example delay line 10 has spiral waveguide loops $16_1$–$16_n$, shown disposed within a single plane.

Broadband optical energy 18, for example, is received at an input end 20 to waveguide spiral 12 and is released through optical tap areas $22_1$–$22_n$ in waveguide loops $16_1$–$16_n$, respectively.

End 24 of waveguide 14 can be a waveguide termination such as a matched load that decreases reflection. It should be noted that the number of waveguide loops shown in FIG. 1A is for illustration purposes. While waveguide loop numbers of least of order 10 are suitable for many purposes, waveguide loop numbers of order 100 will provide greater frequency resolution fidelity. The minimum curvature of the waveguide loops will be dictated by the bending limits suggested by the waveguide manufacturer.

In an understood manner, the length by which optical signals travel in a waveguide affects the phase of the traveling light and hence provides a mechanism by which the colors of the incoming light can be separated. In essence, different waveguide phase lengths permit different frequencies of light to be segregated from other frequencies of light. It is thereby possible to spread the colors of light out by creating a phase length difference that corresponds to a particular desired travel time of the light, wherein 1 divided by this desired travel time creates the approximate upper limit to the frequency resolution of a hyper-resolution AWG.

For example, to create a frequency resolution of approximately 100 MHz (0.1 GHz), a path length (in a vacuum) of approximately 10 feet of travel or 10 nanoseconds of light travel time is required. Because the index of refraction of glass (waveguide) differs from that of a vacuum, a shorter length of fiber is suitable to accomplish this delay. In this instance, approximately six feet of waveguide, between the first and last optical taps 16 (tap $16_1$ and tap $16_n$ of FIG. 1A) provides a 0.1 GHz resolution.

To create a 1 GHz frequency resolution, approximately 0.6 feet of optical waveguide between the first and last optical taps is needed. To create a 10 GHz frequency resolution, approximately 0.06 feet of optical fiber between the first and last optical taps is needed. Higher resolution can be achieved by lengthening the distance between these first and last optical taps.

As will be further explained, light radiated in the proximity of areas 22 of spiral 12 is received for further processing. Referring now to FIG. 1B, there is shown delay line 10 used in conjunction with tap waveguides $26_1$–$26_n$ placed in a close, predetermined, proximity to areas 22 of spiral 12. The spatial relationship between tap waveguides 26 and optical tap areas 22 will be described further herein, but it should be noted here that the tap waveguides are placed close enough to tap areas 22 of loops 16 so as to receive light radiating from the loops.

Figure 2:
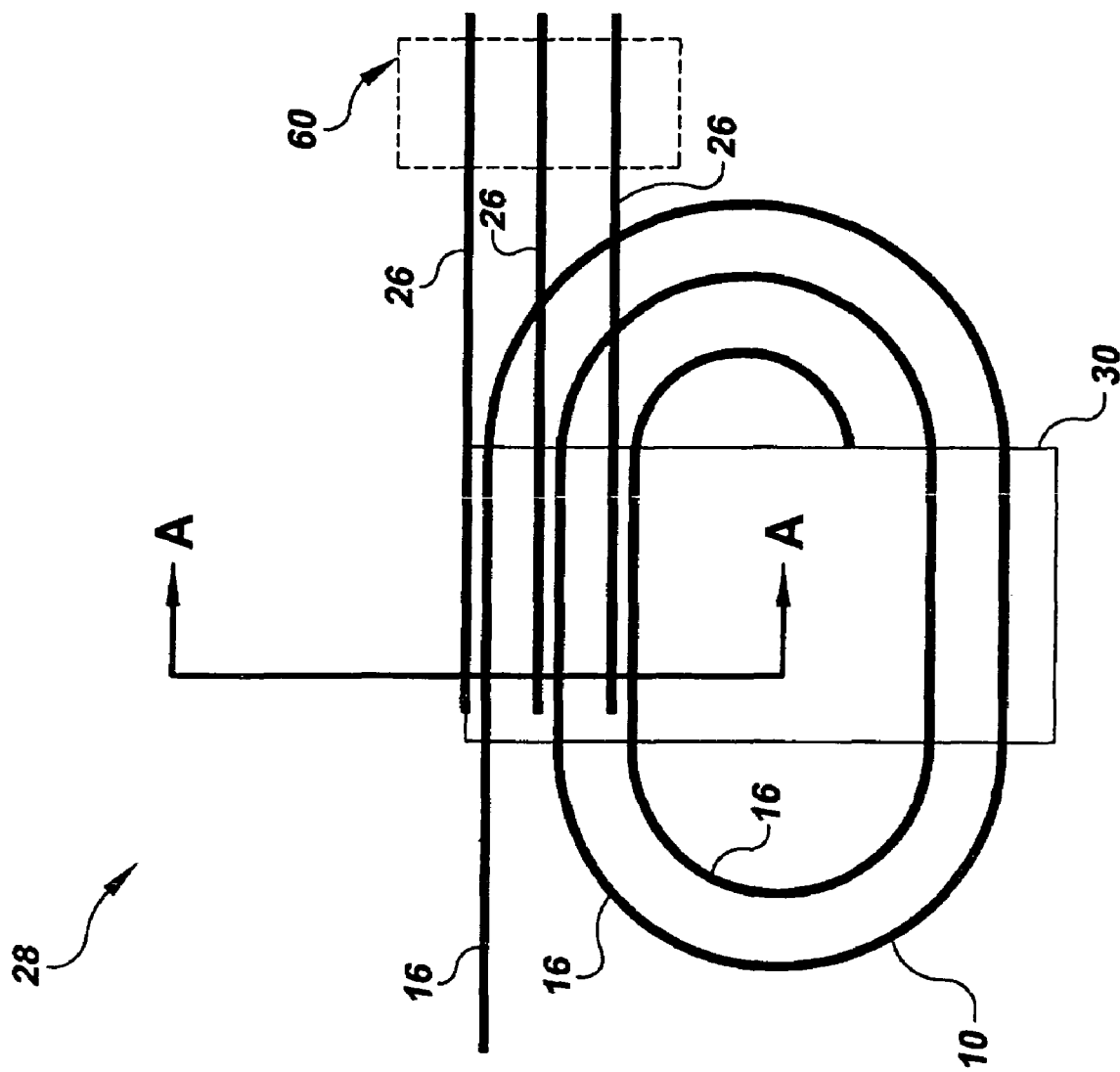
FIG. 2 shows a view of an elongated multiple-tapped optical delay line system.

In FIG. 2, there is illustrated a planar, multiple-tapped optical delay line system 28. In the embodiment shown, delay line 10 is elongated to enhance light collection therefrom. FIG. 2 illustrates a waveguide foundation 30, greater details to be shown, that is positioned to orient loops 16 with respect to tap waveguides 26. At locations where loops 16 and tap waveguides 26 cross, one may add additional waveguide cladding as desired to minimize undesired crosstalk.

Figure 3:
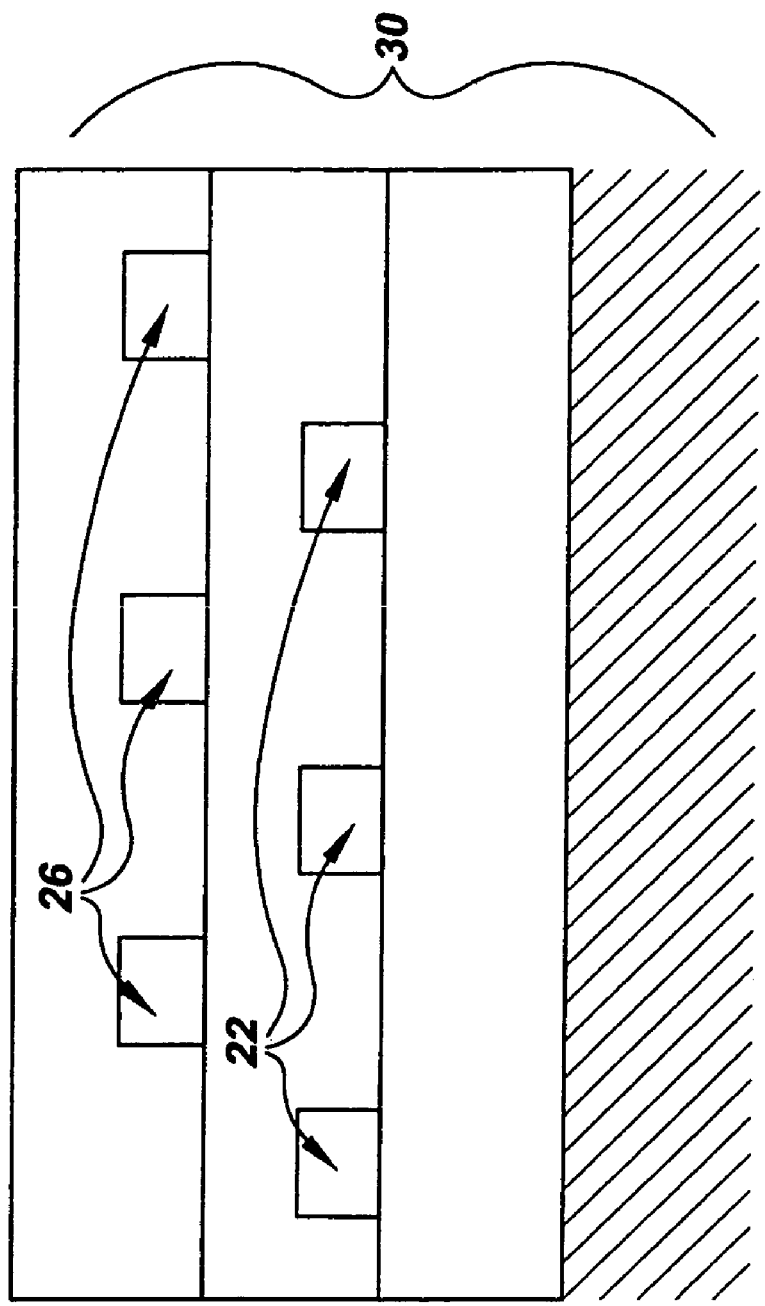
FIG. 3 illustrates a cross section from the perspective of the plane "A" of FIG. 2, emphasizing optical waveguide loops and accompanying tap waveguides.

FIG. 3 is a sectional view taken from the perspective of "A" of FIG. 2, and shows details of the spatial relationship between tap waveguides 26 and the location of optical tap areas 22 of spiral 12. Also shown in FIG. 3, not to scale, is waveguide foundation 30 that can be used to maintain a desired proximity between tap waveguides 26 and optical tap areas 22 of loops 16. Foundation 30 is shown comprising a substrate 32, which can be, for example, silicon or silica; a base 34, which can be, for example, silica approximately 15 µ-meters thick; a first cladding layer 36 which can be, for example, $SiO_2$ having for example Phosphorous and Boron doping wherein layer 36 can for example be of the order 5–30 µ-meters thick; and a second cladding layer 38 which can, for example, be $SiO_2$ with for example Phosphorous and Boron doping, wherein layer 38 can for example be approximately 10–30 µ-meters thick. Spiral 12 and tap waveguides 26 can be, for example, $SiO_2$ with Phosphorous doping, for example. Example processing and design considerations are, wherein T is for temperature and n is for refractive index, Tbase 34>Tcore 22>Tclad 36>Tcore 26>Tclad 38, nclad 36=nbase 34=nclad 38 (all approximately equal), and ncore 22 and 26>nbase36, nclad38.

A similar "foundation" is described in the article titled: "Silica-based optical integrated circuits" by Y. P. Li and C. H. Henry, IEE Proc.-Optoelectron, Vol. 143, No. 5, October 1996.

Spiral 12 and tap waveguides 26 can be of the order of 3 μ-meters thick and 3 μ-meters tall, for example. Tap waveguides 26 can be placed directly above areas 22 of spiral 12, be slightly laterally offset or significantly offset, the latter as illustrated in FIG. 3. A variety of combinations of geometries is possible. These combinations are designed so that the amount of light energy coupled from each optical tap area $22_i$ to each tap waveguide $26i$ is roughly equal to 1 divided by the total number of tap waveguides. For example, a suitable approximate distance between taps 22 and tap waveguides 26 is 3 μ-meters to 10 μ-meters.

Figure 4:
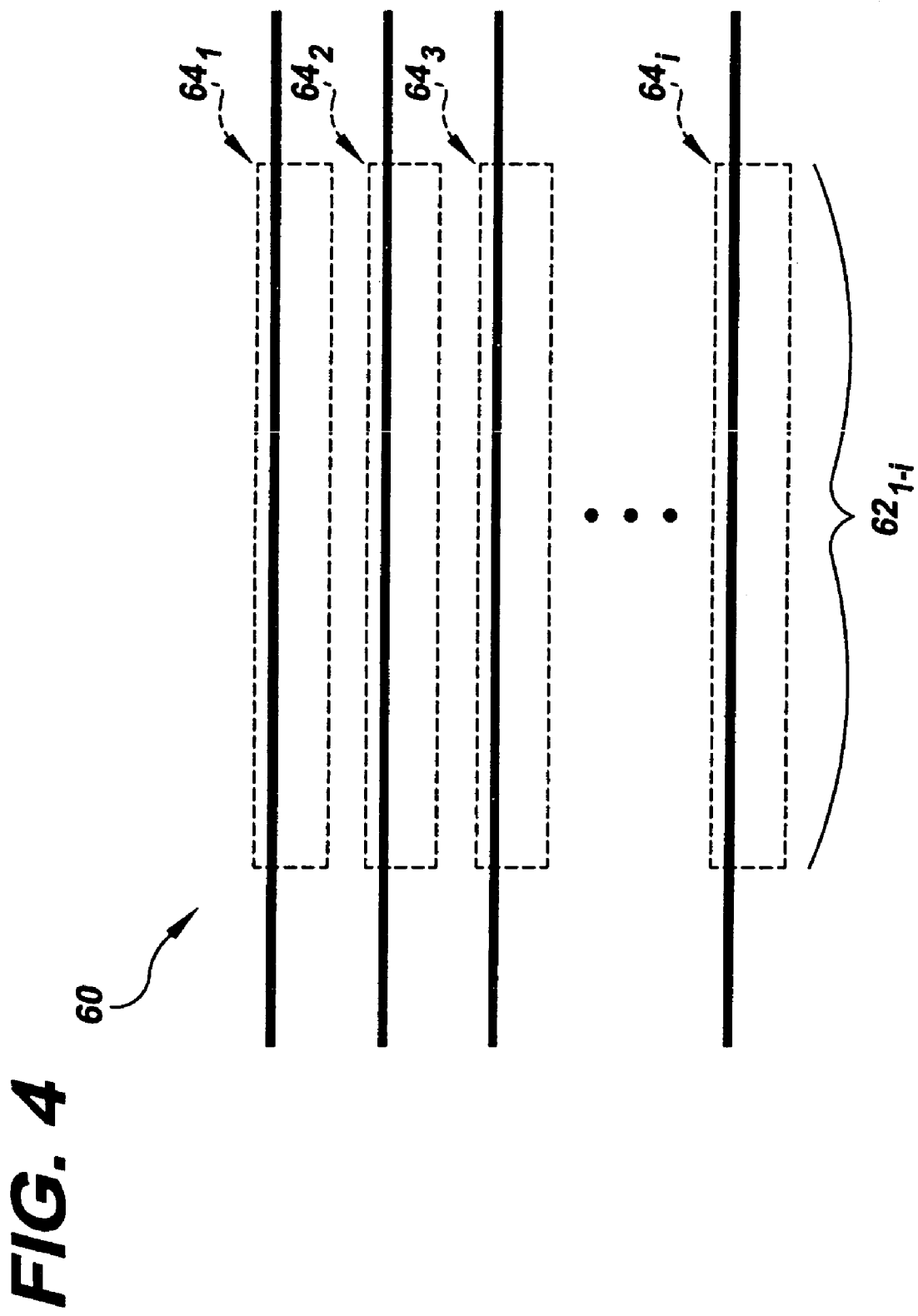
FIG. 4 depicts an optional tuning section as may be used with the multiple-tapped optical delay line according to the description herein.

Referring now to FIG. 4, there is shown an optional waveguide tuning section 60, an outline of which is shown in FIG. 2. One example of tuning section 60 comprises waveguide variable path lengths $62_{1-i}$, which are on the order of 1 to 5 mm long, for example. When current is passed through metallized resistors $64_{1-i}$, the corresponding underlying variable path length sections $62_{1-i}$ are heated to elevated temperatures. The elevated temperatures change the optical path lengths and thereby the phase of light passing through variable path lengths $62_{1-i}$.

Figure 5:
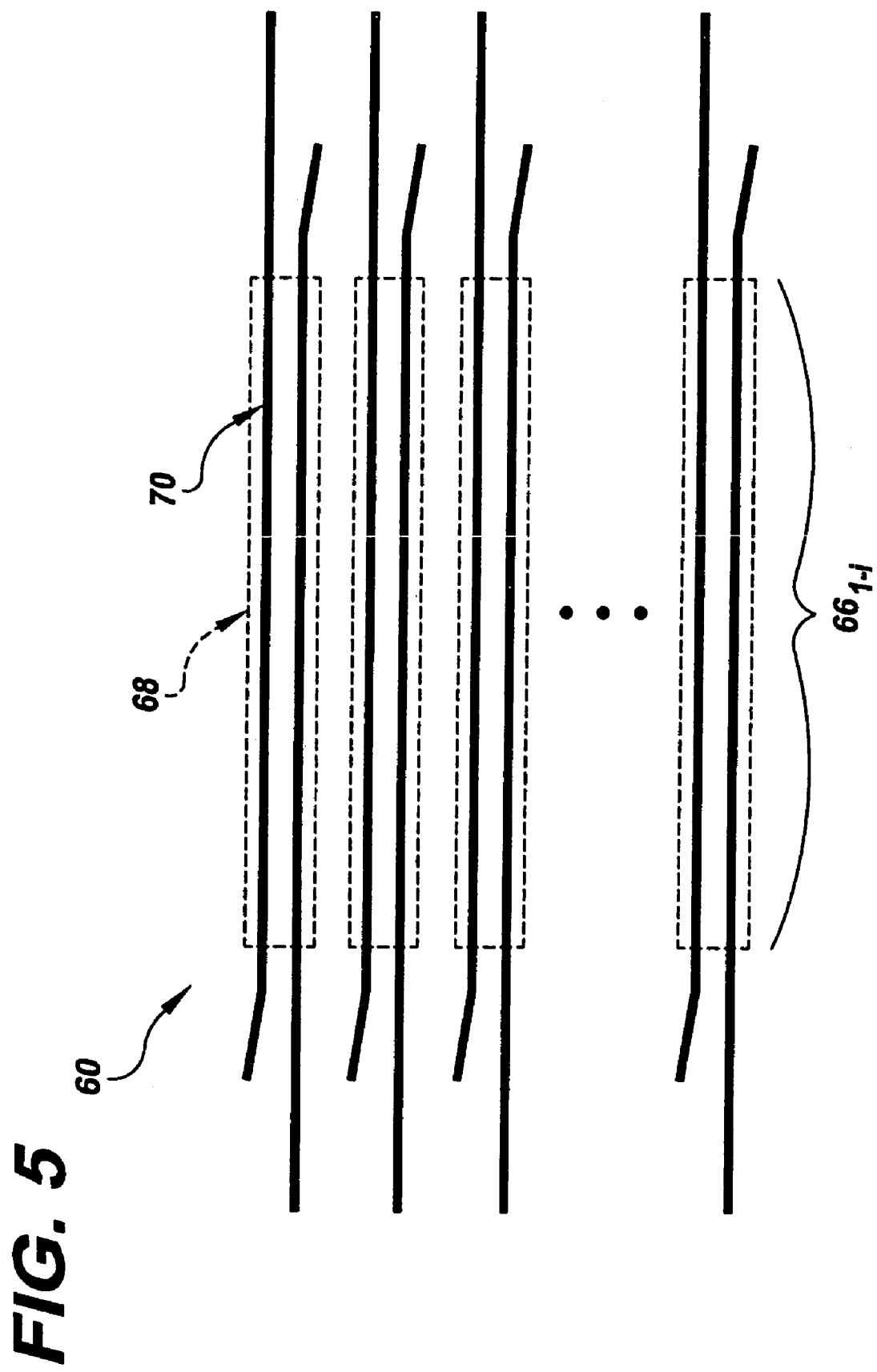
FIG. 5 depicts another optional tuning section as may be used with the multiple-tapped optical delay line according to the description herein.

Referring to FIG. 5, tuning section 60 may also comprise voltage controllable optical attenuators $66_{1-i}$ which are on the order of 1 to 5 mm long. The optical attenuators may be used to set or adjust the amplitude weights of the optical power levels of the different tap waveguides. Similarly as with the embodiment of tuning section 60 of FIG. 4, when current is passed through metallized resistors 68 of the attenuators, the underlying waveguide sections 70 are heated to elevated temperatures. The elevated temperatures change the optical path lengths and thereby the amplitude of light passing through the optical attenuators 66.

The tuning sections have utility in tapped delay systems which are used in very high resolution systems, i.e. systems capable of resolving frequencies more narrowly spaced than about 30 GHz.

Obviously, many modifications and variations are possible in light of the above description. It is therefore to be understood that within the scope of the claims the invention may be practiced otherwise than as has been specifically described.

What is claimed is:

1. An apparatus comprising:
   a spiral of optical waveguide having continuous loops of said waveguide said optical waveguide having an input end wherein optical energy is received;
   optical tap areas in said waveguide wherein optical energy is leaked from said waveguide; and
   optical taps waveguides positioned a predetermined distance from said optical taps for receiving said optical energy leaked at said optical taps and for carrying said received optical energy for further processing, wherein said optical energy carried by said optical tap waveguides is phase tuned in an optical waveguide tuner.

2. The apparatus of claim 1 wherein said optical waveguide tuner includes variable path lengths that are selectively altered by temperature.

3. An apparatus comprising:
   a spiral of optical waveguide having continuous loops of said waveguide, said optical waveguide having an input end wherein optical energy is received;
   optical tap areas in said waveguide wherein optical energy is leaked from said waveguide; and
   optical taps waveguides positioned a predetermined distance from said optical taps for receiving said optical energy leaked at said optical taps and for carrying said received optical energy for further processing, wherein said optical energy carried by said optical tap waveguides is amplitude tuned in an optical waveguide tuner.

4. The apparatus of claim 3 wherein said optical waveguide tuner includes variable path lengths that are selectively altered by temperature.

5. An optical apparatus comprising:
   a substantially planar spiral of optical waveguide having continuous loops of said waveguide, said optical fiber having an input end wherein optical energy is received;
   optical tap areas in said waveguide wherein optical energy is leaked from said waveguide; and
   optical tap waveguides positioned on one side of said planar spiral of optical waveguide for receiving said optical energy leaked from said optical taps and for carrying said received optical energy for further processing; and
   a waveguide foundation wherein at least a portion of said loops of said waveguide and at least a portion of said optical tap waveguides are disposed to position said loops with respect to said optical tap waveguides, wherein said optical energy carried by said optical tap waveguides is phase tuned in an optical waveguide tuner.

6. The apparatus of claim 5 wherein said optical waveguide tuner includes variable path lengths that are selectively altered by temperature.

7. An optical apparatus comprising:
   a substantially planar spiral of optical waveguide having continuous loops of said waveguide, said optical fiber having an input end wherein optical energy is received;
   optical tap areas in said waveguide wherein optical energy is leaked from said waveguide; and
   optical tap waveguides positioned on one side of said planar spiral of optical waveguide for receiving said optical energy leaked from said optical taps and for carrying said received optical energy for further processing; and
   a waveguide foundation wherein at least a portion of said loops of said waveguide and at least a portion of said optical tap waveguides are disposed to position said loops with respect to said optical tap waveguides, wherein said optical energy carried by said optical tap waveguides is amplitude tuned in an optical waveguide tuner.

8. The apparatus of claim 7 wherein said optical waveguide tuner includes variable path lengths that are selectively altered by temperature.

* * * * *